(12) United States Patent
Martinez

(10) Patent No.: US 9,941,676 B2
(45) Date of Patent: Apr. 10, 2018

(54) CABLE PULLING DEVICE WITH POSITIONING AND HOLDING PLATES

(71) Applicant: Chris Martinez, Pinole, CA (US)

(72) Inventor: Chris Martinez, Pinole, CA (US)

( * ) Notice: Subject to any disclaimer, the term of this patent is extended or adjusted under 35 U.S.C. 154(b) by 514 days.

(21) Appl. No.: 14/149,238

(22) Filed: Jan. 7, 2014

(65) Prior Publication Data

US 2014/0191170 A1    Jul. 10, 2014

Related U.S. Application Data

(60) Provisional application No. 61/749,388, filed on Jan. 7, 2013.

(51) Int. Cl.
*H02G 1/08* (2006.01)

(52) U.S. Cl.
CPC .................. *H02G 1/085* (2013.01)

(58) Field of Classification Search
CPC ................ H02G 1/08; G02B 6/4463
USPC .................................. 254/134.3 R
See application file for complete search history.

(56) References Cited

U.S. PATENT DOCUMENTS

| | | | | | |
|---|---|---|---|---|---|
| 2,746,715 | A | * | 5/1956 | Sherrod | H02G 1/08 254/134.3 R |
| 3,306,581 | A | * | 2/1967 | Miller | H02G 1/08 254/134.3 FT |
| 4,358,089 | A | * | 11/1982 | Metcalf | H02G 1/08 248/231.71 |
| 4,541,615 | A | * | 9/1985 | King, Jr. | H02G 1/08 254/134.3 FT |
| 4,600,176 | A | * | 7/1986 | Ludwigs | H02G 1/08 254/134.3 FT |
| 4,909,481 | A | * | 3/1990 | Tamm | H02G 1/08 254/134.3 R |
| 4,946,137 | A | * | 8/1990 | Adamczek | H02G 1/08 254/134.3 FT |
| 5,029,817 | A | * | 7/1991 | Tamm | H02G 1/08 254/134.3 R |
| 5,385,314 | A | * | 1/1995 | Hughes | B65H 54/2866 242/397.3 |
| 6,517,052 | B1 | * | 2/2003 | Lake | H02G 1/06 254/134.3 PA |
| 6,672,567 | B1 | * | 1/2004 | Chembars | H02G 1/08 254/134.3 FT |

(Continued)

*Primary Examiner* — Christopher M Koehler
*Assistant Examiner* — Brian Keller
(74) *Attorney, Agent, or Firm* — Imperium Patent Works

(57) ABSTRACT

A roller support structure is used during wire or cable installation for substantial labor savings during the wire or cable pulling process and for protection of the wire or cable. The wire or cable is pulled through a cable fitting by installing a roller support structure containing rollers onto the fitting. In some embodiments the rollers are removed from the cable fitting after a cable is pulled through the fitting. For efficient roller removal, the roller support structure has positioning and holding plate pairs. By moving the positioning plates relative to the holding plates, the rollers are held in place or dropped from channels in the holding plates. In another novel embodiment, a cable fitting slide plate structure is used to move a cable through a cable fitting. This structure includes a low friction inside bottom surface plane of arcuate shape for efficient movement of the cable through the fitting.

20 Claims, 13 Drawing Sheets

(56) References Cited

U.S. PATENT DOCUMENTS

| | | | | |
|---|---|---|---|---|
| 6,729,606 B1* | 5/2004 | Durin | ............... | B65H 57/14 |
| | | | | 242/615.2 |
| 7,323,637 B2* | 1/2008 | Tideback | ............. | H02G 1/08 |
| | | | | 174/50 |
| 7,419,136 B2* | 9/2008 | Martinez | ............. | H02G 1/08 |
| | | | | 174/50 |
| 8,342,483 B1* | 1/2013 | Manning | ............. | H02G 1/08 |
| | | | | 254/134.3 FT |
| 8,579,260 B2* | 11/2013 | Raineri | ............. | H02G 1/08 |
| | | | | 254/134.3 R |

* cited by examiner

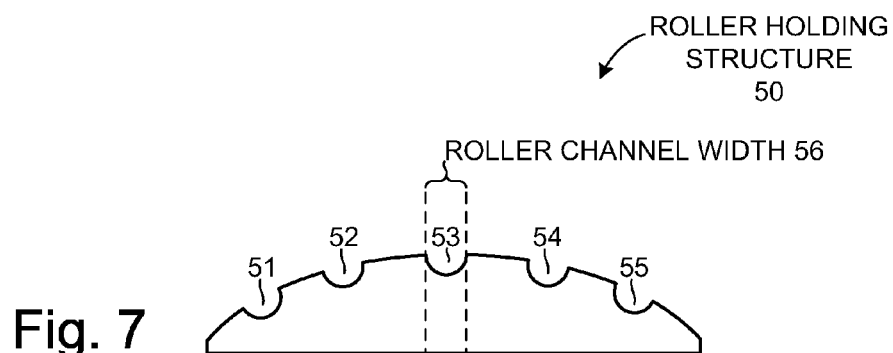
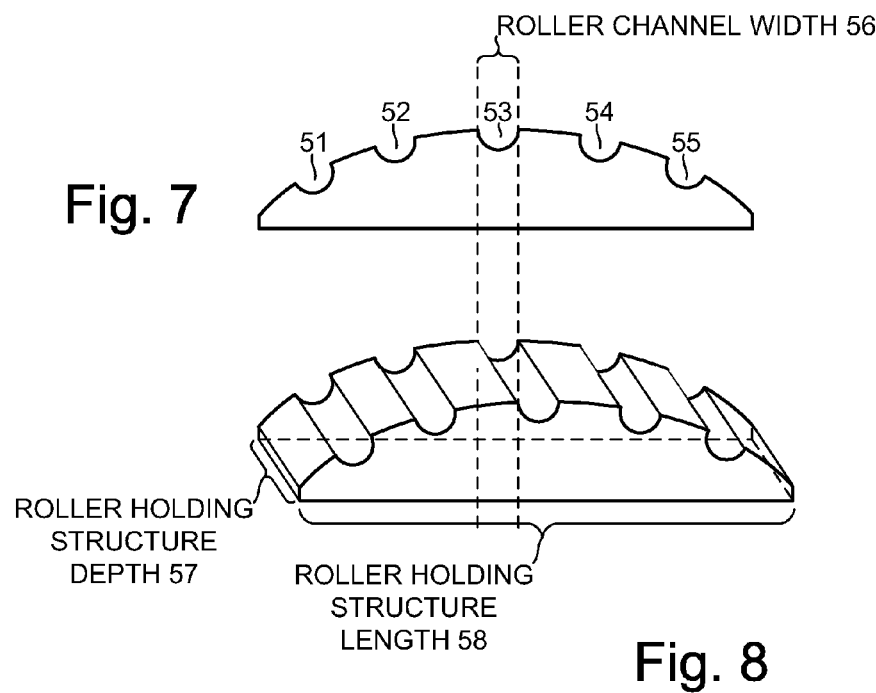
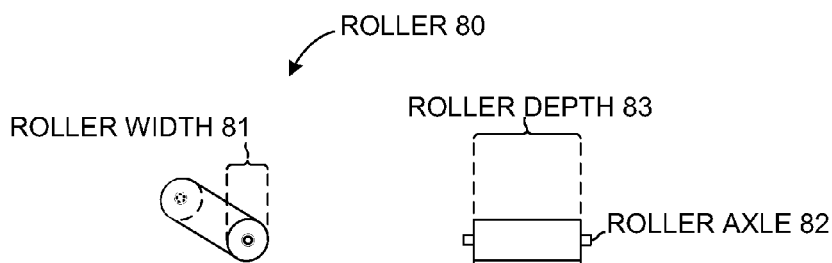
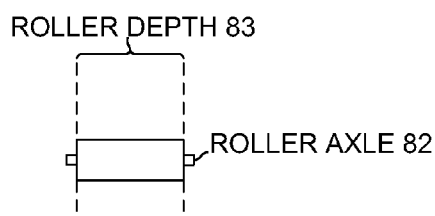

CABLE PULLING DEVICE WITH POSITIONING AND HOLDING PLATES

CROSS REFERENCE TO RELATED APPLICATION

This application claims the benefit under 35 U.S.C. § 119 from provisional U.S. patent application Ser. No. 61/749,388, entitled "Cable Pulling Device With Positioning and Holding Plates," filed on Jan. 7, 2013, the subject matter of which is incorporated herein by reference.

BACKGROUND INFORMATION

During cable installation, cables may be routed through conduit and cable fittings for protection of the cables. FIG. 1 (Prior Art) is a diagram showing one such cable fitting where a cable is to make a bend. These fittings are commercially available and may be Crouse Hinds, Appleton, or other similar cable fittings. The cable fitting has a first opening 2 and a second opening 3. FIG. 2 (Prior Art) is a top-down diagram of the cable fitting of FIG. 1 that also shows an interior volume 4 of the cable fitting. FIG. 3 (Prior Art) shows the cable fitting of FIG. 1 after a cable 9 has been pulled through the cable fitting. Cable 9 is pulled through cable fitting 1 by routing the end of cable 9 through the first opening 2 of cable fitting 1, through interior volume 4 and then out through second opening 3 of cable fitting 1.

To facilitate insertion of a cable through a cable fitting, a roller support structure as described in U.S. Pat. No. 7,419,136 to Martinez, may be utilized. Such a roller support structure is shown in FIG. 4 and includes a frame 11, a first side plate 12, a second side plate 13, a plurality of rollers 19-23, a plurality of j-shaped roller channels 14-18, mounting holes 24-27, and an anchor connection member 28. The frame 11 includes four mounting holes 24-27 that extend through frame 11. The first side plate 12 containing J-shaped roller channels 14-18 is attached to a first side of the frame 11. The second side plate 13 is attached to a second side of frame 11 opposite first side plate 12. Each of the plurality of rollers 19-23 has an axle and the axle is used to position a roller into each of the plurality of j-shaped roller channels 14-18. Each roller is secured between the first side plate 12 and a second side plate 13 by an axle extending from one channel in first side plate 12 to a corresponding channel in second side plate 13. The j-shaped roller channels are constructed such that the rollers form a bend radius or arc with the roller 19 and roller 23 positioned farther from the frame than roller 21 which may be positioned midway between roller 19 and roller 23 and closest to frame 11. Before a cable is pulled through the fitting, the roller support structure 10 is attached to the cable fitting. The roller support structure can be secured to cable fitting 1 using mounting holes 24-27 of frame 11 and attachment points 5-8 of cable fitting 1. Bolts may be inserted through each of mounting holes 24-27 located on frame 11 and then into each of the corresponding attachment points 5-8 of cable fitting 1.

After securing the roller support structure 10 to cable fitting 1, the cable 9 can be pulled through the first opening 2 of cable fitting 1, over rollers 19-23 and then out of second opening 3 of cable fitting 1. FIG. 5 (Prior Art) shows a frame 11 secured to a cable fitting 1 with a cable 9 that has been pulled through cable fitting 1 and is disposed above rollers 19-23. FIG. 5 also shows a first spacer 30 and a second spacer 31 between a cover plate plane 33 and frame 11. An inside bottom surface plane 32 is within interior volume 4 of cable fitting 1 at a location along the bottom surface of cable fitting 1 opposite cover plate plane 33. After cable 9 is pulled through cable fitting 1 as shown in FIG. 5, the rollers 19-23 can be removed and then roller support structure 10 can be removed from cable fitting 1. To remove rollers 19-23, the bolts attaching frame 11 to cable fitting 1 are removed and then first spacer 30 and second spacer 31 are removed from between frame 11 and cover plate plane 33. This allows roller support structure 10 to descend into the cable fitting and allows rollers 19-23 to be removed from the interior volume of the cable fitting. To remove rollers 19-23, the rollers must be lifted in the direction of cover plate plane 33 in order for the rollers to drop out of j-shaped roller channels 14-18.

In some cable installations rollers 19-23 can be removed without any difficulty. In other installations, the rollers can be difficult to remove. FIG. 6 (Prior Art) shows one such example where it is difficult to remove rollers 19-23 from within the interior volume 4 of cable fitting 1. FIG. 6 shows a frame 11 secured to a cable fitting 1 with a cable 9 that has been pulled through the fitting and is disposed above rollers 19-23. In this FIG. 6, the first and second spacers have been removed and roller support structure 10 has been lowered further into the cable fitting 1 and is positioned just above the inside bottom surface plane 32. Cable 9, which is disposed above rollers 19-23 within interior volume 4 of the cable fitting has also shifted towards inside bottom surface plane 32. The weight a large diameter cable may cause the cable to shift from a point closer to the cover plate plane 33 in FIG. 5 towards inside bottom surface plane 32. This movement of cable 9 makes it difficult to retrieve rollers 19-23 from the interior volume 4 of cable fitting 1. The rollers need to be lifted out of the j-shaped roller channels for removal and the weight of cable 9 may prevent the removal of the rollers 19-23 from the j-shaped roller channels. This may also happen when the cable 9 is a group of smaller diameter cables. A roller support structure that allows efficient extraction of rollers 19-23 from the interior volume of the cable fitting is desired.

SUMMARY

A roller support structure is used during wire or cable installation for substantial labor savings during the wire or cable pulling process and for protection of the wire or cable. The wire or cable is pulled through a cable fitting by installing a roller support structure containing rollers onto the fitting. The roller support structure is attached before the cable or guide rope is installed and removed after the cable pull is completed. The device may include a roller support frame, rollers, spacers, a roller holding structure, and an anchor point. The roller support frame allows for the device to be attached to a Crouse Hinds, Appleton, or similar fitting. The roller holding structure is positioned below the rollers which are suspended from the frame and allows the rollers to rotate over a low-friction surface during the cable pulling process. The roller holding structure supports the rollers and cable after the first and second spacers are removed and while the roller support structure is lowered into the fitting. The roller support structure can then be removed by sliding it relative to the rollers and lifting it out of the cable fitting. Once the roller support structure is removed the rollers and roller holding structure can be removed. In alternative embodiments the rollers and the roller holding structure are not removed from the interior volume of the cable fitting. In yet other embodiments, the roller holding structure has channels and the rollers are snapped into the channels of the roller holding structure before insertion into the interior volume of the cable fitting and before installation of the cable.

In yet another embodiment, the frame of the roller support structure has a first side and a second side and a first positioning and holding plate pair is disposed upon said first side and a second positioning and holding plate pair disposed upon said second side opposite said first positioning and holding plate pair. The roller holding plate has horizontal and vertical channels with the horizontal channels adapted for holding the rollers in place and the positioning plate has vertical channels for securing the rollers in place during cable installation and also when the vertical channels in the positioning and holding plates are aligned, for allowing the rollers to drop from the channels after cable installation and during removal of the roller support structure from the cable fitting.

In yet another embodiment, the roller support structure and a wire slide assembly are attached to a cable fitting before cable installation. The wire slide assembly guides the cable through the fitting during cable installation. The roller support structure and wire slide assembly are removed after the cable is moved through the fitting. In yet another embodiment, the roller support structure is removed after the cable is installed into the fitting but the wire slide assembly remains in the internal volume of the cable fitting.

In yet another novel embodiment, a cable fitting slide plate structure is used to move a cable through a cable fitting. The cable fitting slide plate structure includes an interior volume, an inside bottom surface plane, a first shoulder support structure, a second shoulder support structure and a structural support bridge. The cable fitting slide plate structure may be made of metal or other hard suitable material. The cable fitting slide plate structure can be manufactured by casting or machined as necessary and can also be of unitary construction. The cable fitting slide plate structure can be of a size necessary to fit within the volume of an electrical cable fitting such as a Crouse Hinds BUB fitting, an Appleton UB fitting, or any other suitable fitting. The cable fitting slide plate structure has a width and the width of the cable fitting slide plate structure may be just less than width of a cable fitting. In this manner the cable fitting slide plate structure may be more stable when disposed within the interior volume of a cable fitting during wire pulling operations. The Cable fitting slide plate structure also includes an inside bottom surface plane that, in one novel embodiment is of arcuate shape. The arcuate shape has a radius and the radius has a range of forty degrees to one hundred-twenty degrees. The structural support bridge is attached to the arcuate shaped bottom portion of the cable fitting slide plate structure and extends from one side of the cable fitting slide plate structure to the opposite side. Structural support bridge is included to prevent and or eliminate structural failures that may otherwise occur if excessive sidewall pressure is present during a wire pull. In alternate embodiments, the structural support bridge is not included. The inside bottom surface plane may include a low-friction surface that may be a near frictionless carbon film, a low friction polymeric compound, or any other suitable low friction material. First shoulder support structure and second shoulder support structure make contact with the first and second conduit openings within the interior volume of the cable fitting, but may also make contact with a conduit near the first and second openings of the cable fitting when the cable fitting slide plate structure is disposed within a cable fitting.

To move a cable through a cable fitting with the cable fitting slide plate structure, a cable fitting slide plate structure is placed within the volume of the cable fitting. In some embodiments, the cable fitting slide plate structure will be fastened to the cable fitting using the cover attachment holes of the cable fitting. A pull rope is then pulled through the cable fitting through the first opening of the cable fitting, through the first shoulder support structure of the cable fitting slide plate structure and through the interior volume of the cable fitting slide plate structure and over the inside bottom surface plane of the cable fitting slide plate structure. The pull rope is then fed through the second shoulder support structure of the cable fitting slide plate structure and then out of the second opening of the cable fitting. The pull rope is connected to the cables and the cables are pulled through the conduit and cable fitting using a wire tugger or other methods known to those skilled in the art until the cable has been moved through the conduit and cable fitting a desired length. Because the inside bottom surface plane is of arcuate radius and low friction, the cable is able to be pulled through the cable fitting without creating excessive sidewall pressure. In some novel embodiments, the cable is moved through more than one cable fitting with cable fitting slide plate structure simultaneously.

BRIEF DESCRIPTION OF THE DRAWINGS

The accompanying drawings, where like numerals indicate like components, illustrate embodiments of the invention.

FIG. 7 is a side view drawing of a roller holding structure.

FIG. 8 is another drawing of a roller holding structure.

FIG. 9 is a drawing of a roller.

FIG. 10 is a side view drawing of a roller showing a roller axle.

DETAILED DESCRIPTION

Reference will now be made in detail to some embodiments of the invention, examples of which are illustrated in the accompanying drawings.

FIG. 7 is a drawing of a roller holding structure 50. Roller holding structure 50 includes roller channels 51-55. The roller holding structure 50 and roller channels 51-55 are positioned such that a maximum bend radius is maintained within a cable fitting as a cable moves through the cable fitting. This is to prevent damage to the cable and is especially useful when delicate cables, such as fiberoptic or similar cables are being pulled through cable fittings. The roller holding structure is shaped with smooth edges that will not allow damage to cable insulation as cable is being pulled through the cable fitting 1.

Figure 1:
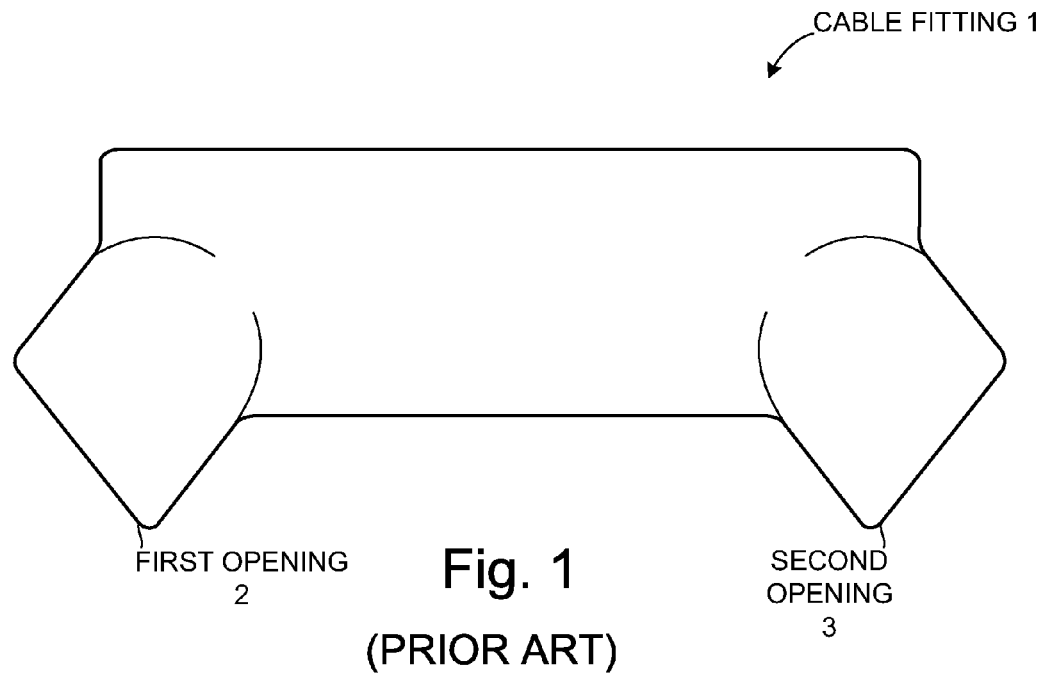
FIG. 1 (Prior Art) is a drawing of a cable fitting.

Each roller channel 51-55 has a width. Roller channel 53 is shown with a roller channel width 56. The roller holding structure has a roller holding structure depth 57 and a roller holding structure length 58. The roller holding structure depth 57 is selected such that the roller holding structure can fit within a variety of commercially available cable fittings. Roller holding structure depth 57 is dependent on the width of the cable fitting 1 and may be between one-half inch to four and one-half inches in depth. Similarly, the roller holding structure length 58 is selected such that the roller holding structure length 58 extends the distance between the first opening 2 and the second opening 3 of the cable fitting 1 of FIG. 1. The roller holding structure length 58 may be between four inches and thirty inches in length. The roller holding structure 50 may be made of metal, a hard plastic, vinyl material, a polymeric compound with a low coefficient of friction, or any other suitable material that may make contact with the rollers during the cable pulling process without creating substantial friction or resistance to the rotation of the rollers. FIG. 9 is a drawing of a roller 80 showing the width 81 of roller 80. FIG. 10 is a side view drawing of roller 80 and shows a depth 83 of roller 80. FIG. 10 also shows a roller axle 82 extending axially through roller 80. Roller 80 can be made of metal or hard plastic or any other material suitable for supporting a cable as it is pulled through a cable fitting. The roller channel width 56 of FIG. 7 may be selected such that it is wider than roller width 81 and allows the rollers to rotate as a cable is pulled through the cable fitting over the roller holding structure 50. In another embodiment, the roller channel width 56 is selected such that the width 56 is slightly less than roller width 81 so the roller can snap into the roller channel. In this manner, each roller is secured within a roller channel but is still able to rotate as a cable is moved through the cable fitting. In an alternative embodiment, the roller holding structure 50 is constructed of two expandable and or collapsible sections such to have variable roller holding structure depth 57.

Figure 11:
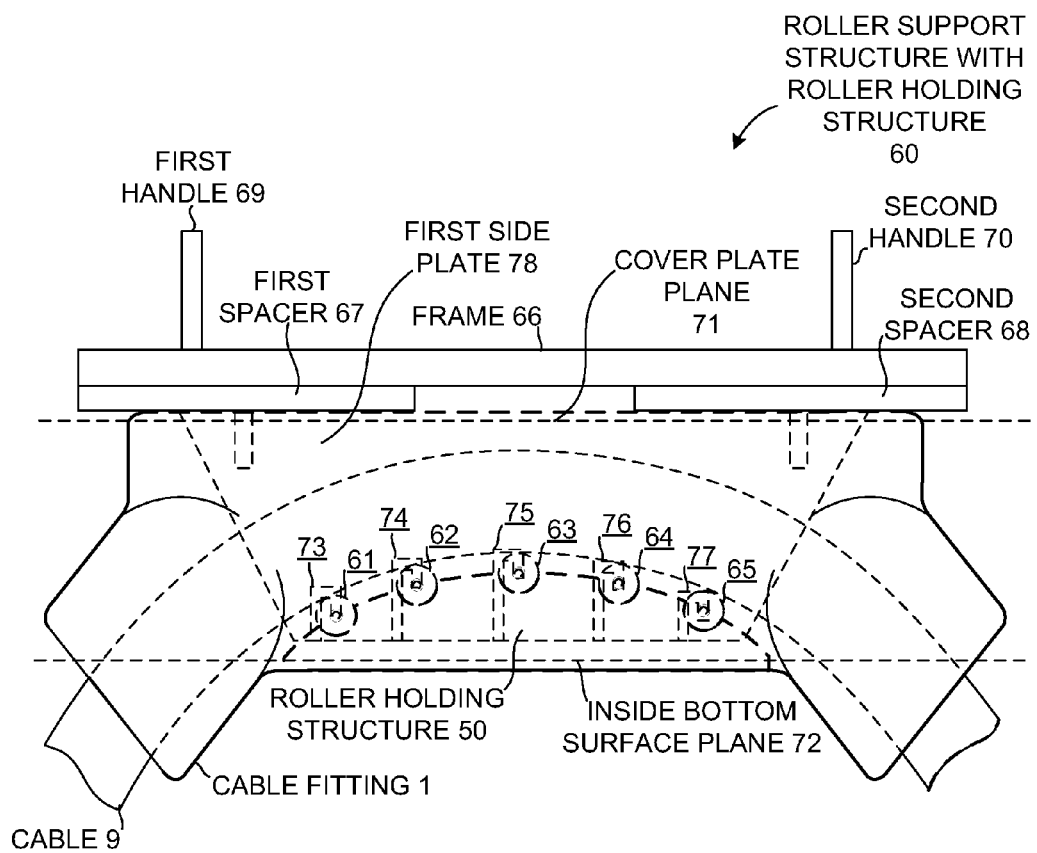
FIG. 11 is a perspective side view drawing of a roller support structure, spacers, a cable fitting, a roller holding structure and a cable.

FIG. 11 is a drawing of a roller support structure 60 with a roller holding structure 50. Roller support structure includes a first handle 69, second handle 70, frame 66, first side plate 78, second side plate 79 (not shown), and rollers 61-65. First side plate 78 is attached to a first side of frame 66 and second side plate 79 is attached to a second side of frame 66 opposite the first side of frame 66 and first side plate 78. First side plate 78 has j-shaped roller channels 73-77. Second side plate 79 has similar corresponding j-shaped roller channels. Rollers 61-65 are disposed between first side plate 78 and second side plate 79. Each of rollers 61-65 has an axle and the axle extends from the j-shaped roller channel on first side plate 78 to the corresponding j-shaped channel on the second side plate 79. Cable fitting 1 is also shown in FIG. 11. Cable fitting 1 has an interior volume, a cover plate plane 71 and an inside bottom surface plane 72. The first side plate 78, second side plate 79, and rollers 61-65 are disposed within the interior volume of cable fitting 1 and between the inside bottom surface plane 72 and the cover plate plane 71. The roller holding structure is also disposed within the interior volume of the cable fitting, above inside bottom surface plane 72, and supports rollers 61-65. Each of rollers 61-65 is disposed within a roller channel of roller holding structure 50. A first spacer 67 and a second spacer 68 are also shown in FIG. 11 and the first and second spacers 67-68 are disposed between the frame 66 and cover plate plane 71.

The roller support structure, frame 66, first side plate 78 and second side plate 79 may be constructed of metal or other material suitable for supporting a large cable within a fitting and withstanding the forces present when cable 9 is pulled through cable fitting 1, over the rollers 61-65 and roller holding structure 50. The first and second side plates can be constructed from steel, aluminum, or other suitable metal. The thickness of the first and second side plates can vary based on the width of the cable fitting 1 of FIG. 1 and may be of a thickness in a range of 0.065 inches to 0.50 inches.

Figure 12:
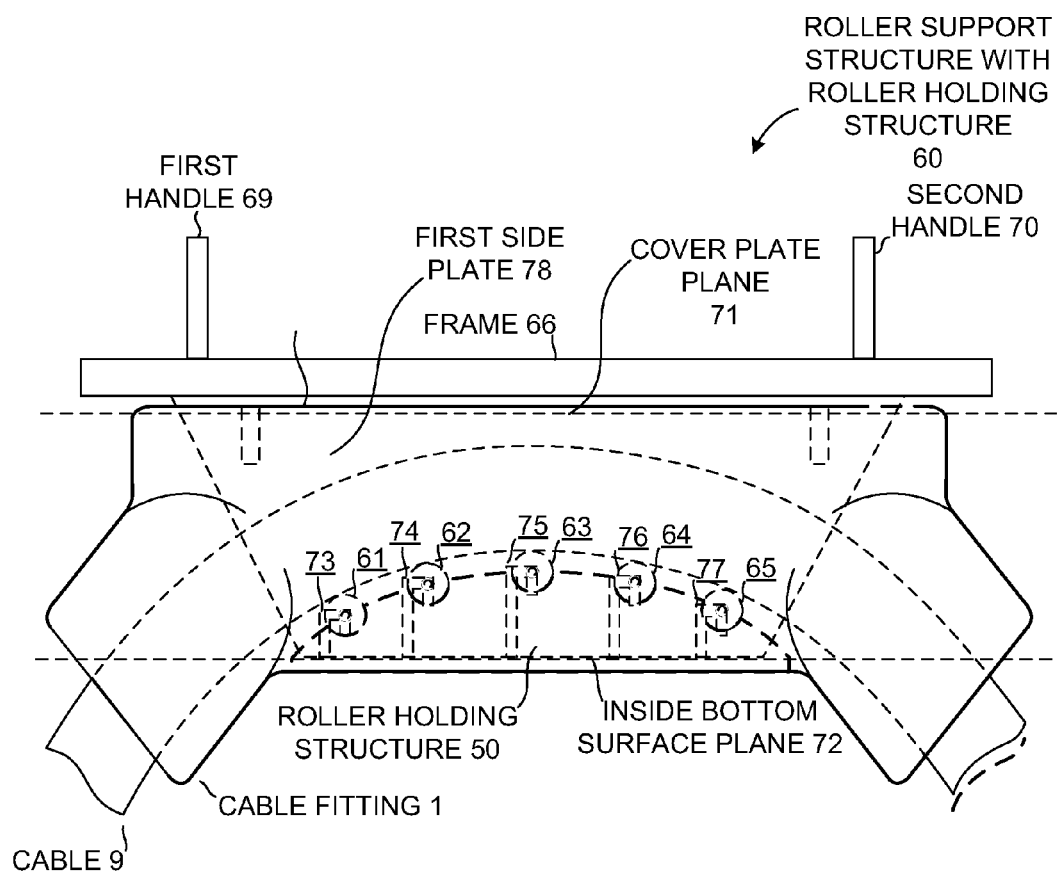
FIG. 12 is a perspective side view drawing of a roller support structure, spacers, a cable fitting, a roller holding structure and a cable after the spacers have been removed from between the roller support structure and the cable fitting.

FIG. 12 is a drawing showing the roller support structure with the roller holding structure of FIG. 10 after cable 9 has been pulled through cable fitting 1 and after the spacers 67 and 68 have been removed. The roller holding structure 50 is supporting cable 9 and the roller support structure has been moved farther towards inside bottom surface plane 73 such to cause the axles of rollers 61-65 to move to a position within the j-shaped channels that is closer to frame 66. The roller support structure can now be moved horizontally with respect to the roller holding structure 50 to cause the axles of rollers 61-65 to disengage from the j-shaped channels. The roller support structure can then be removed from cable fitting 1 leaving cable 9, roller holding structure 50, and rollers 61-65 within the interior volume of cable fitting 1. Once the roller support structure is removed, cable 9 can be pushed to one side of cable fitting 1 and rollers 61-65 and roller holding structure 50 can be removed from the interior volume of cable fitting 1. In another embodiment, the rollers 61-65 and roller holding structure 50 are not removed from the interior volume of the cable fitting. In this embodiment, the rollers 61-65 and roller holding structure will not be reused for multiple cable installations and materials selected to construct the rollers 61-65 and roller holding structure 50 should be selected such that they are relatively inexpensive to manufacture compared to rollers and roller holding structures that will be used repeatedly.

Figure 13:
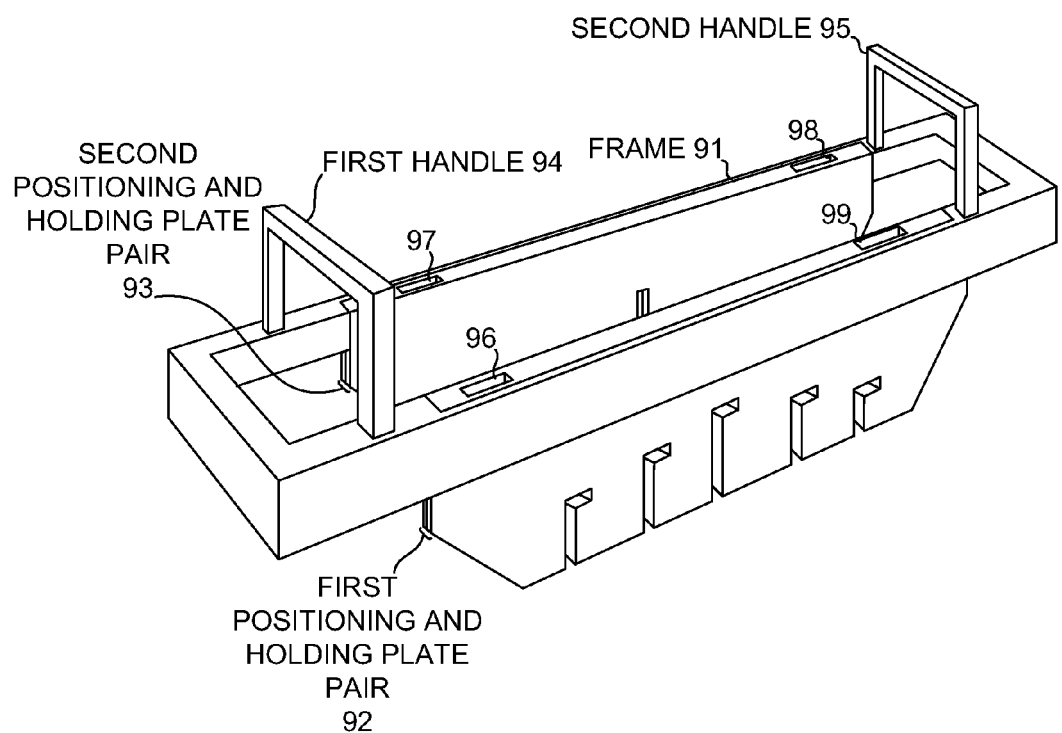
FIG. 13 is a drawing of a roller support structure with positioning and holding plate pairs in accordance with one novel aspect.

FIG. 13 is a drawing of a roller support structure with positioning and holding plate pair structures 90. The roller support structure of FIG. 13 includes a first handle 94, a second handle 95, frame 91, first positioning and holding plate pair 92, and second positioning and holding plate pair 93. Attachment points 96-99 are shown and may be used to fasten the roller positioning plate in each positioning and holding plate pair to the frame 91. Screws, bolts, or other fasteners can be placed through attachment points 96-99 and into corresponding holes in frame 91 respectively. The first positioning plate of pair 92 is connected to a first side of frame 91 and the second positioning plate of pair 93 is attached to a second side of frame 91 opposite the first side of frame 91 and opposite the first positioning plate pair 92. The holding plate of each of first positioning and holding plate pair 92 and second positioning and holding plate pair 93 are fixed in place to a first side of frame 91 and a second side of frame 91 respectively. The holding plates of each pair support the rollers and cable during a wire pull. In one novel embodiment the positioning plates of each pair are movable with respect to the frame and holding plates. In this embodiment the positioning plates can move relative to the frame and holding plates such that rollers are either held in place or released from the holding plates.

Figure 14:
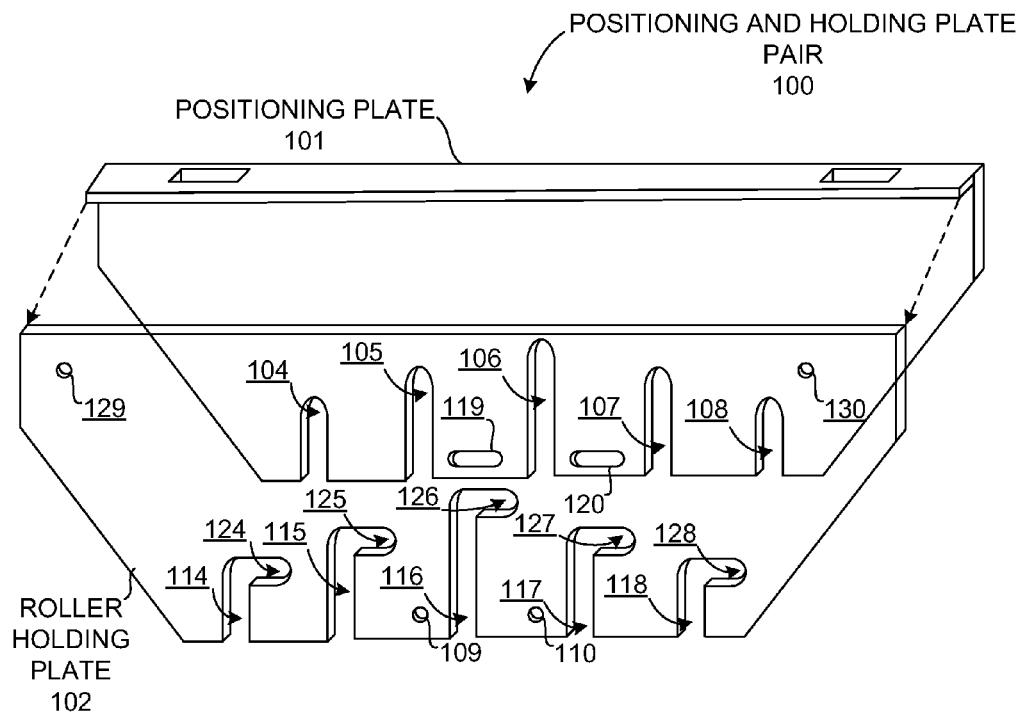
FIG. 14 is a drawing of a roller holding plate and a roller positioning plate.

FIG. 14 is a drawing of a positioning and holding plate pair 100. The positioning and holding plate pair 100 includes a positioning plate 101 and a roller holding plate 102. Roller positioning plate 101 has a top portion and a bottom portion with positioning channels 104-108 extending vertically from the bottom portion. Roller positioning plate also has slotted holes 119 and 120 for fastening the roller positioning plate 101 to the roller holding plate 102 of each positioning and holding plate pair 100. Roller holding plate 102 has a top portion and a bottom portion and shaped channels extending from the bottom portion. Each shaped channel has a horizontal roller holding position portion 124-128 and a vertical roller positioning portion 114-118. The width of the horizontal roller holding positions 124-128 and the width of the vertical roller positioning portion of the shaped channels is approximately 0.03125 inches larger then the diameter of the roller axles of the rollers. Roller holding plate 102 also includes holes 109, 110, 129, and 130. Any of holes 109, 110, 129, and 130 may be threaded. Screws, bolts or other fasteners can secure roller holding plate to the frame of the support structure utilizing holes 129 and 130. Holes 109 and 110 may be used to fasten the roller positioning plate 101 to roller holding plate 102. Screws, bolts or other fasteners may be inserted through the slotted holes 119 and 120 of the roller positioning plate 101 and into the holes 109 and 110 respectively of the roller holding plate 102 to secure the roller positioning plate 101 to roller holding plate 102. The fasteners should be loosely connected to allow each roller positioning plate 101 to slideably move relative to holding plate 102 of each positioning and holding plate pair. Although only two slotted holes (119 and 120) and two points of attachment (holes 109 and 110) are shown, any number of slotted holes or points of attachment or any other suitable method of attachment may be used to adequately attach the positioning plates to the holding plates. In one embodiment, the roller axles are 5/16 inches in diameter and the width of the horizontal roller holding positions 124-128 and the width of the vertical roller positioning portion of the shaped channels is approximately 11/32 inches in width such to receive an axle of a roller. The roller holding plate 102 and positioning plate 101 can be made of metal approximately 0.065 inches to 0.50 inches in thickness in order to withstand the force of a heavy cable moving over the rollers held in place by the positioning and holding plate pair 100. Other suitable thicknesses may be used depending on the materials used to manufacture the plates.

Figure 15:
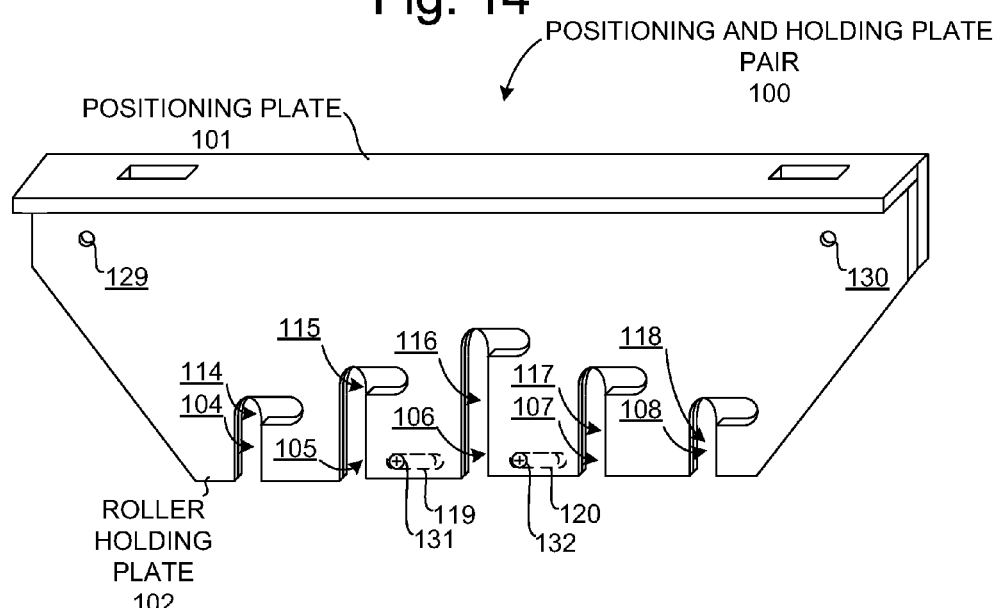
FIG. 15 is a drawing of a roller holding plate and a roller positioning plate where the roller positioning plate is positioned to allow for removal of rollers

FIG. 15 is a drawing of a positioning and holding plate pair 100 that includes a roller holding plate 102 and a positioning plate 101. The roller positioning plate has vertical channels 104-108 and the roller holding plate 102 has shaped channels with horizontal holding positioning portions 124-128 and vertical roller positioning portions 114-118. In this FIG. 15, the plates are shown in the roller "release" position. The vertical channels 104-108 of the roller positioning plate 101 are in alignment with the vertical roller positioning portions 114-118 of the roller holding plate 102. In this position, the rollers can be inserted before a cable pull or removed after the cable has been completely pulled through the fitting. Also shown in this FIG. 15 are screws 131 and 132. Screws 131 and 132 are shown passing through slotted holes 119 and 120 of the roller positioning plate 101 and into holes 109 and 110 of the roller holding plate 102.

Figure 16:
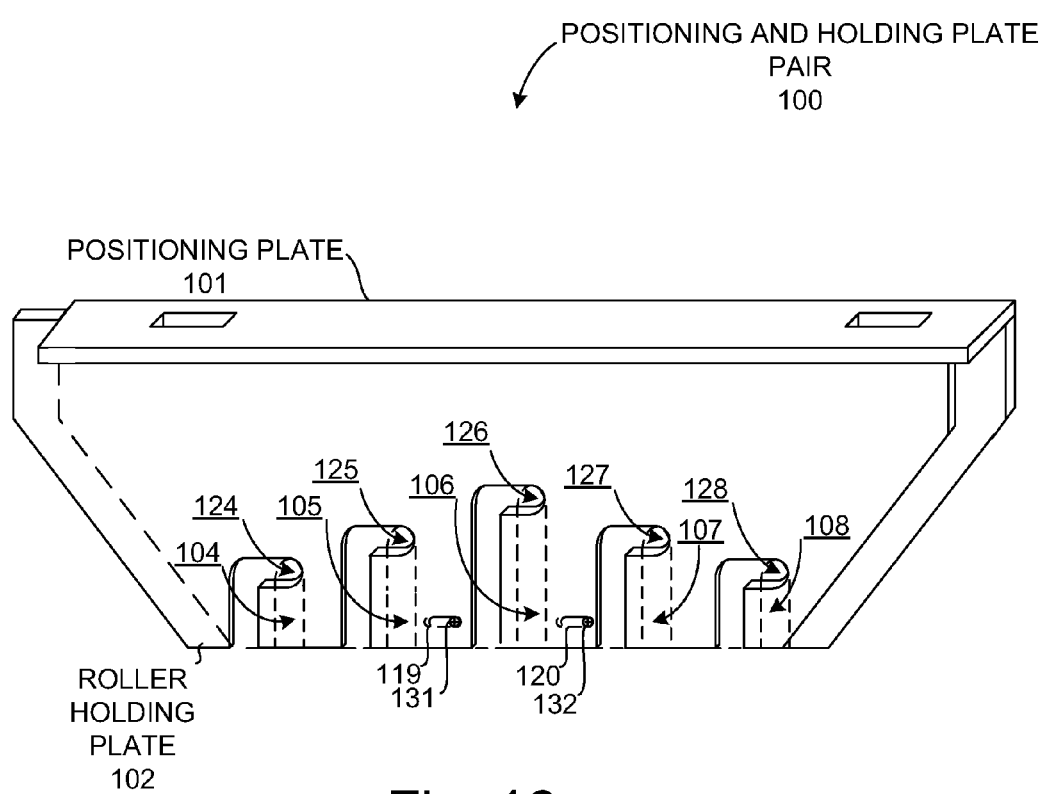
FIG. 16 is a drawing of a roller holding plate and a positioning plate where the positioning plate is positioned to hold the rollers in position for cable installation.

FIG. 16 is a drawing of a positioning and holding plate pair 100 that includes a roller holding plate 102 and a positioning plate 101. In this FIG. 16, the plates are shown in the roller "holding" position. The vertical channels 104-108 of the roller positioning plate 101 are in alignment with the horizontal roller positioning portions 124-128 of roller holding plate 102. In this position, the rollers are held in place while a cable is moved through the cable fitting.

In one novel embodiment, each of the positioning plates 101 of each positioning and holding plate pair 100 are fitted within a recessed area, or within the volume of each of the respective holding plates 102 of each positioning and holding plate pair 100. In this embodiment, each of the holding plates may be secured to the frame while each of the positioning plates is slidably coupled to the respective roller holding plate to allow for movement between the roller "holding" position and the roller "release" or "insertion" position. In this novel embodiment a handle may be connected to each of the roller positioning plates to ensure substantially similar movement of each of the positioning plates 101 of each positioning and holding plate pair 100. This handle could ensure a smooth and continuous sliding motion of the positioning plates 101 relative to each of the roller holding plates 102. In alternative embodiments, a handle may be fastened to each of the positioning plates when the positioning plates are located outside of the volume of each of the respective holding plates 102 of each positioning and holding plate pair 100.

Figure 17:
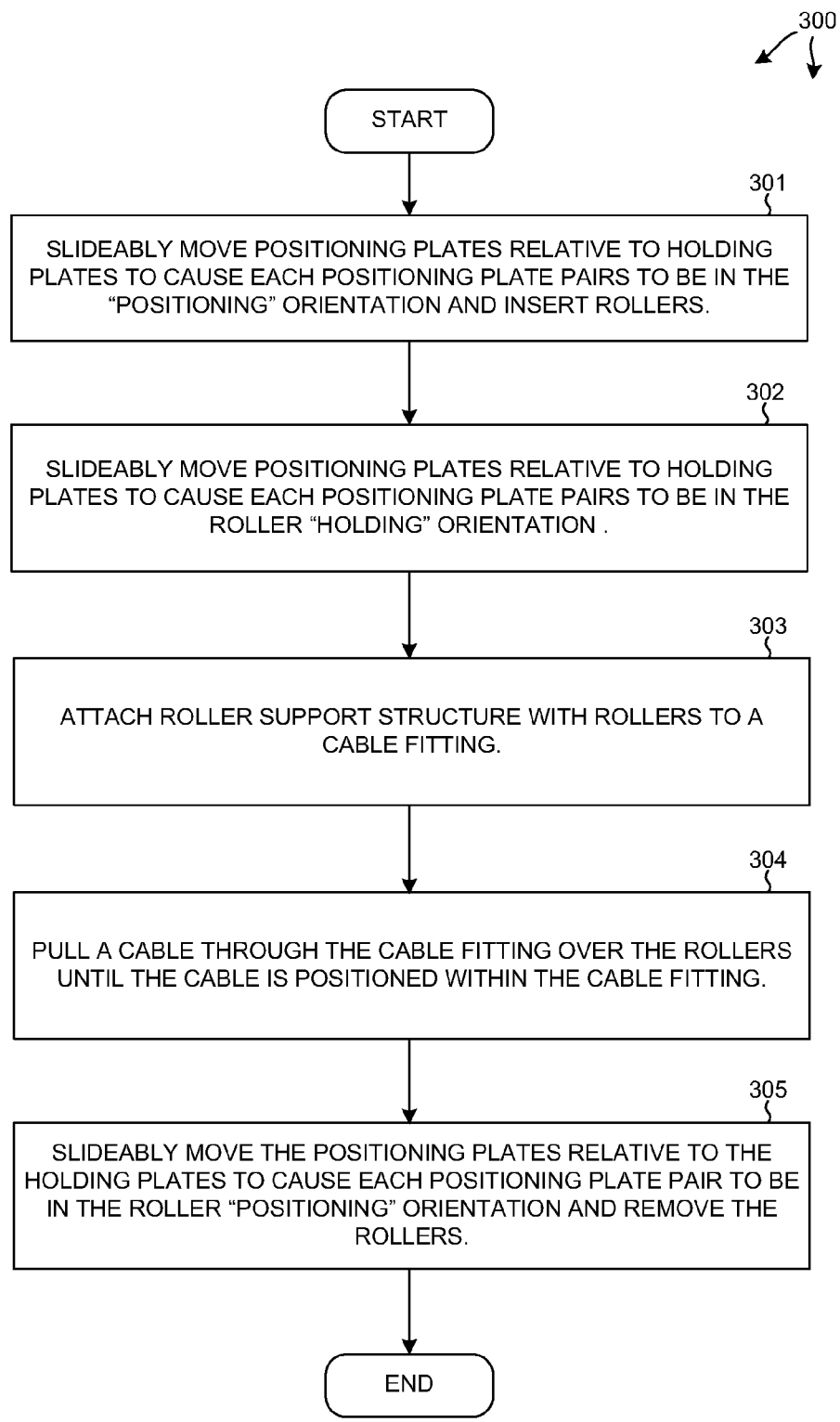
FIG. 17 is a flowchart of a novel method of pulling a cable through a cable fitting using a roller support structure with roller holding and positioning plate pairs.

To pull a cable through the cable fitting, the novel method 300 of FIG. 17 may be employed. In a first step 301 of the novel method, the first and second positioning plate pairs 92-93 of the roller support structure of FIG. 13 are slideably moved to the orientation shown in FIG. 15 and rollers are inserted into the vertical channels 104-108 of the positioning plate 101 and the vertical portion 114-118 of the shaped channels of the roller holding plate 102. In a second step 302, the roller holding plate 102 and positioning plate 101 are slideably moved to the roller "holding" orientation wherein positioning plate 102 moves the axles of each roller to the horizontal portions 124-128 of roller holding plates 101. In this manner the rollers are held in place before the cable is pulled through the fitting. In a third step 303, the roller support structure with position plate pairs and rollers is then affixed to the cable fitting using mounting holes extending through the frame of the roller support structure and the attachment points of the cable fitting. In a fourth step 304, the cable is pulled through the fitting, over the rollers of the roller support structure until the cable is installed within the cable fitting. In a fifth step 305, the roller support structure is detached from the cable fitting and the positioning plate pairs 92-93 are then slideably moved relative to each other into the roller "positioning" or "release" orientation of FIG. 15. The vertical channels 104-108 of the positioning plate 102 and the vertical portion 114-118 of the shaped channels of the roller holding plate 101 are in alignment and the rollers have moved from the previous position and have been released from the vertical channels of the positioning plates 92-93. The cable can then be pushed towards one side of the cable fitting and the rollers can be removed from the interior of the cable fitting.

Figure 18:
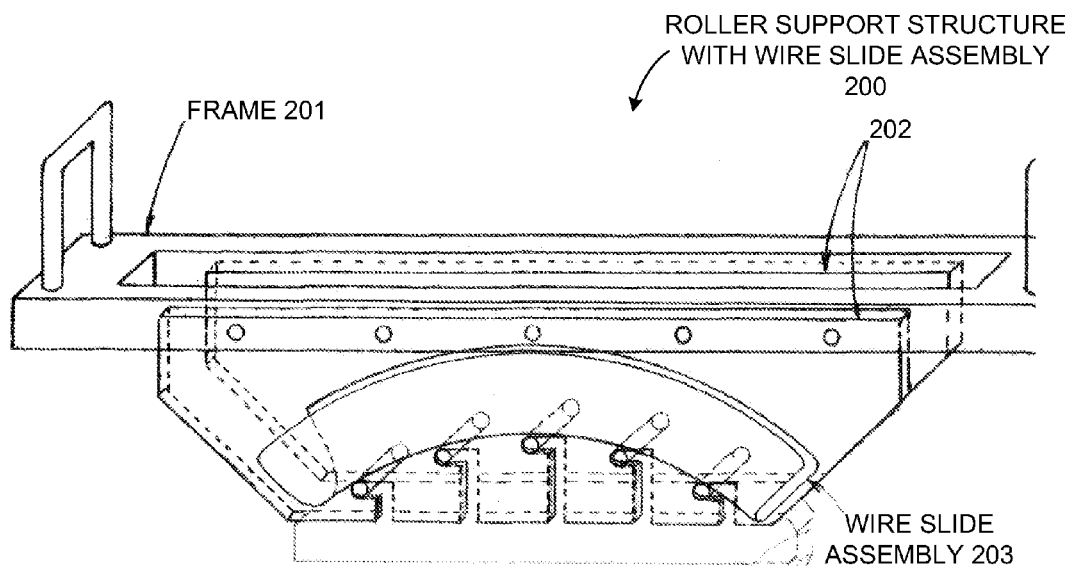
FIG. 18 is a drawing showing a roller support structure with a wire slide assembly.

FIG. 18 is a drawing of a roller support structure with a wire slide assembly 200. The roller support structure has a frame 201 and a pair of roller holding plates 202 and a wire slide assembly 203. Wire slide assembly 203 has a trough portion for guiding a cable through the fitting during a cable pull. The trough portion is made of metal of suitable strength to withstand the forces of a heavy cable moving through the cable fitting and have a thickness wherein the thickness is in the range of 0.03125 inches to 0.25 inches. In one novel embodiment, the trough portion is coated with an ultra-hard, low friction polymer or other suitable coating sufficient to allow a low coefficient of friction during the wire or cable pulling process. In FIG. 18, the wire slide assembly 203 is held in place by plate pair 202.

Figure 19:
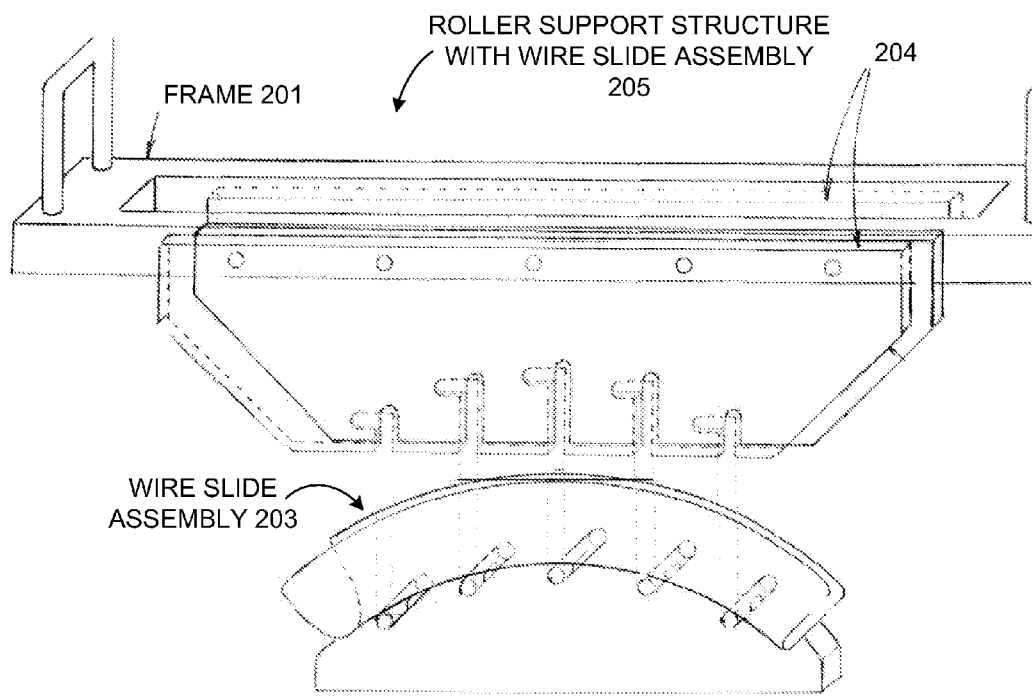
FIG. 19 is another drawing of a roller support structure and a wire slide assembly where the wire slide assembly has been removed from the roller support structure.

FIG. 19 shows another embodiment of a roller support structure with wire slide assembly 205. In this embodiment, the wire slide assembly 203 is held in place or released from the roller support structure by pairs of roller positioning and holding plate pairs 204. The roller positioning plate and roller holding plates of roller positioning and holding plate pairs 204 can be slideably moved relative to each other to hold or release the wire slide assembly 203. In one embodiment, the wire slide assembly is removed from the internal volume of a cable fitting after a cable has been pulled through the cable fitting. In yet another embodiment, the wire slide assembly 203 remains within the internal volume of the cable fitting after the cable is pulled through the cable fitting and after the roller support structure has been removed from the cable fitting.

Figure 20:
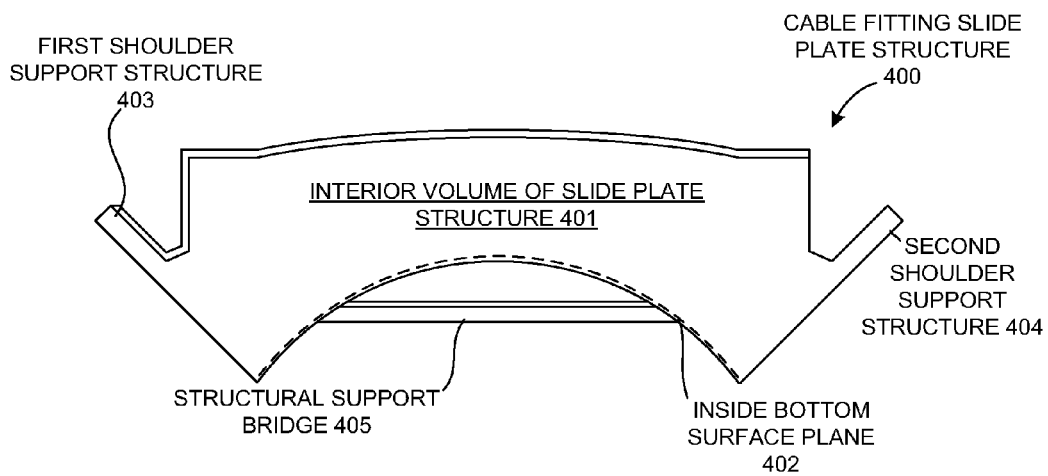
FIG. 20 is a drawing showing a cable fitting slide plate structure.

FIG. 20 is a drawing of a cable fitting slide plate structure 400. Cable fitting slide plate structure 400 includes an interior volume 401, an inside bottom surface plane 402, a first shoulder support structure 403, a second shoulder support structure 404 and a structural support bridge 405. The cable fitting slide plate structure 400 may be made of metal or other hard suitable material. The cable fitting slide plate structure 400 can be manufactured by casting or machined as necessary and can also be of unitary construction. The cable fitting slide plate structure 400 can be of a size necessary to fit within the volume of an electrical conduit fitting such as a Crouse Hinds BUB fitting, an Appleton UB fitting, or any other suitable fitting. The cable fitting slide plate structure 400 has a width and the width of the cable fitting slide plate structure may be just less than width of a cable fitting. In this manner the cable fitting slide plate structure 400 may be more stable when disposed within the interior volume of a cable fitting during wire pulling operations. The Cable fitting slide plate structure 400 has an inside bottom surface plane 402 that, in one novel embodiment is of arcuate shape. The arcuate shape has a radius and the radius have a range of forty degrees to one hundred-twenty degrees. Structural support bridge 405 is attached to the arcuate shaped bottom portion of the cable fitting slide plate structure 400 and extends from one side of the cable fitting slide plate structure 400 to the opposite side. Structural support bridge 405 is included to eliminate structural failures that may otherwise occur if excessive sidewall pressure is present during a wire pull. The inside bottom surface plane 402 may include a low-friction surface that may be a near frictionless carbon film, a low friction polymeric compound, or any other suitable low friction material. First shoulder support structure 403 and second shoulder support structure 404, in one novel embodiment, make contact with the first and second conduit openings within the interior volume of the cable fitting, they may also make contact with a conduit near the first and second openings of the conduit fitting when the cable fitting slide plate structure 400 is disposed within a cable fitting.

Figure 2:
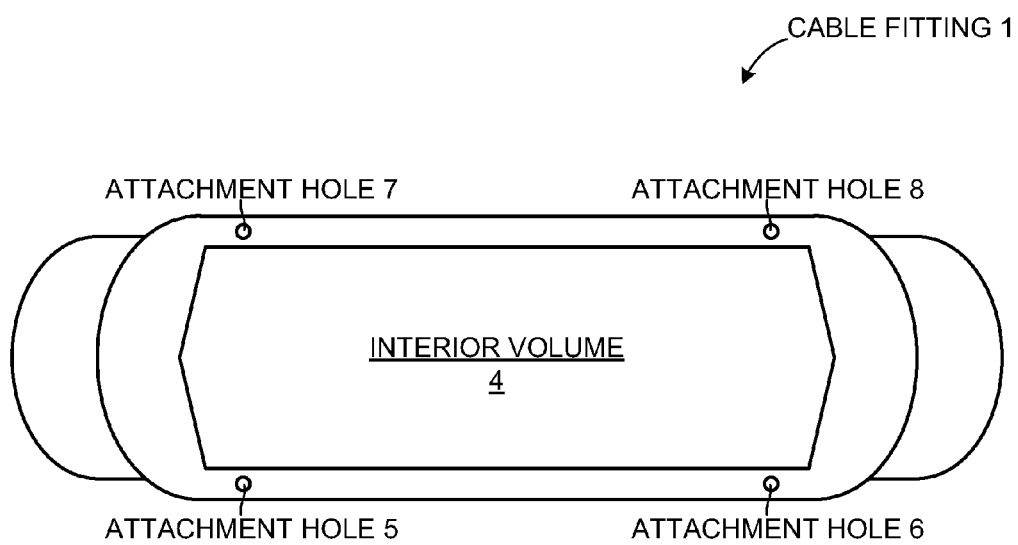
FIG. 2 (Prior Art) is a top down drawing of a cable fitting.
Figure 3:
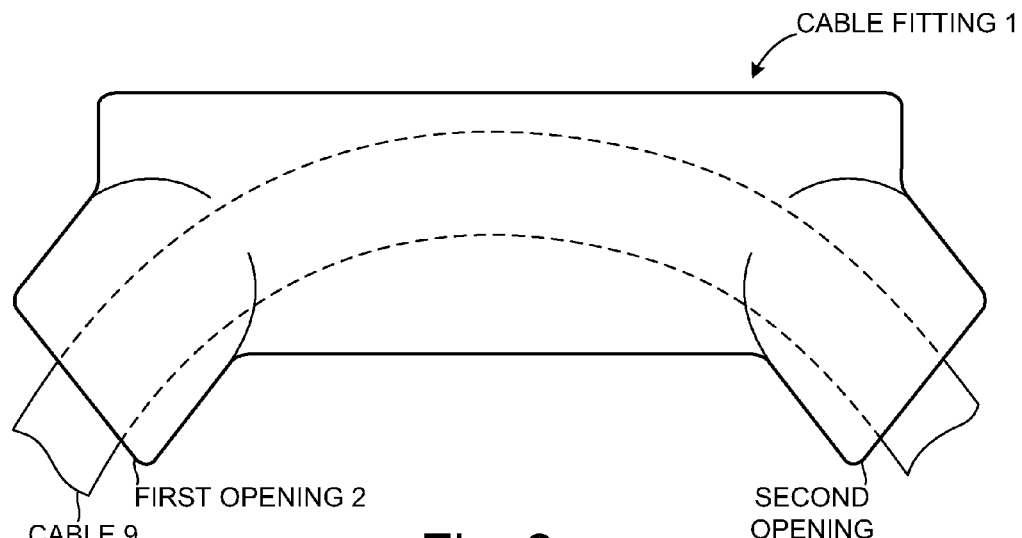
FIG. 3 (Prior Art) is a drawing of a cable fitting after a cable has been pulled through the cable fitting.
Figure 4:
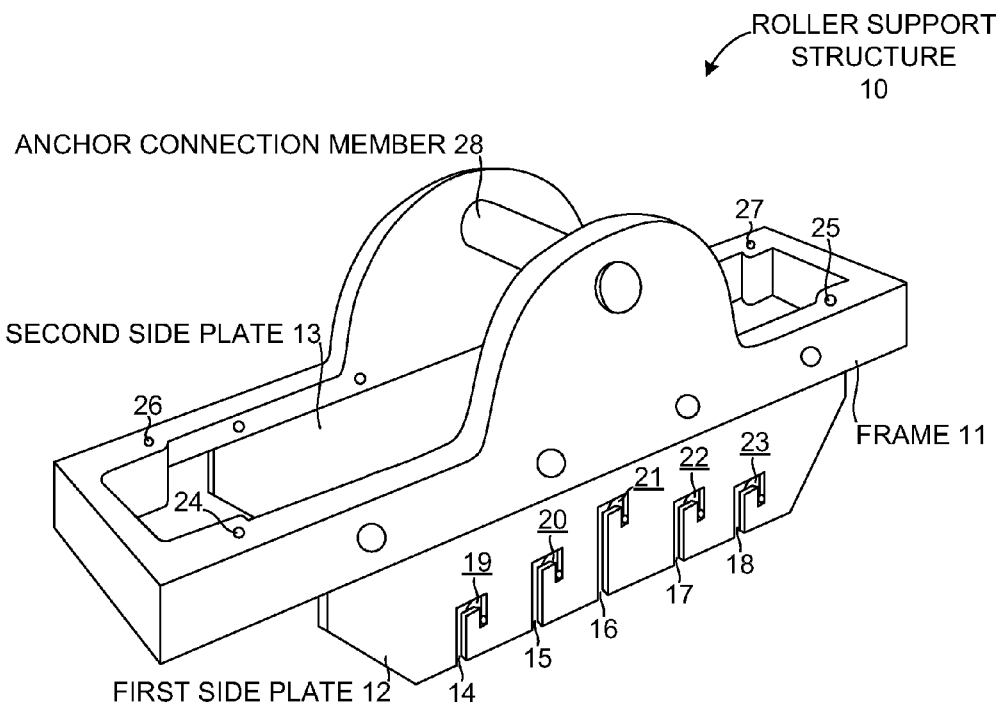
FIG. 4 (Prior Art) is a drawing of a roller support structure.
Figure 5:
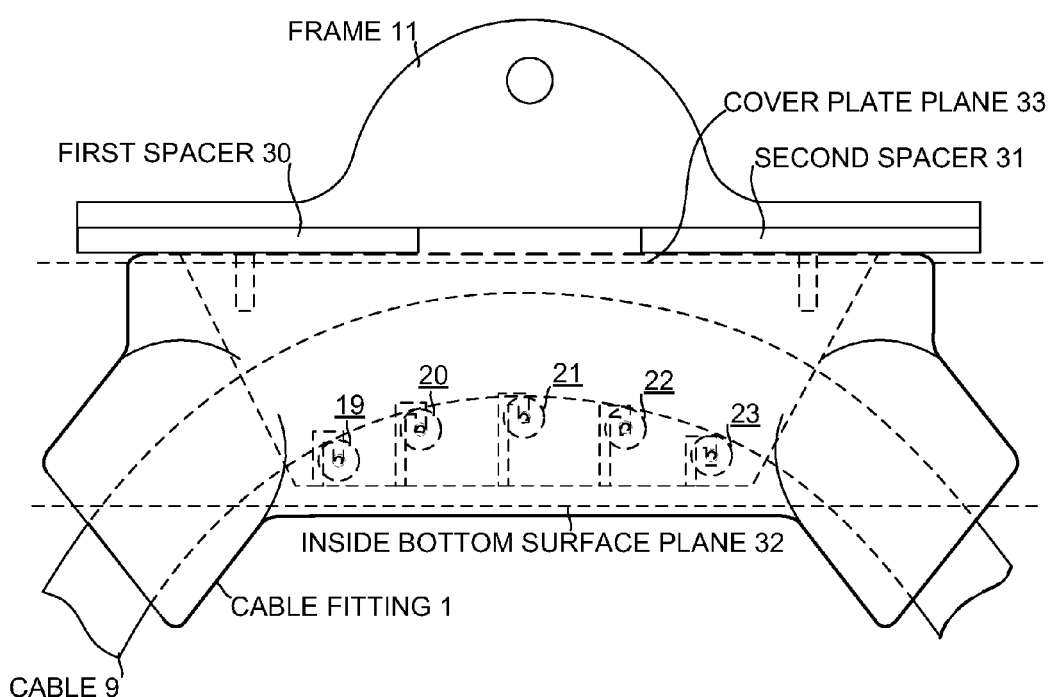
FIG. 5 (Prior Art) is a side view drawing of a roller support structure and spacers coupled to a cable fitting after a cable has been pulled through the cable fitting.
Figure 6:
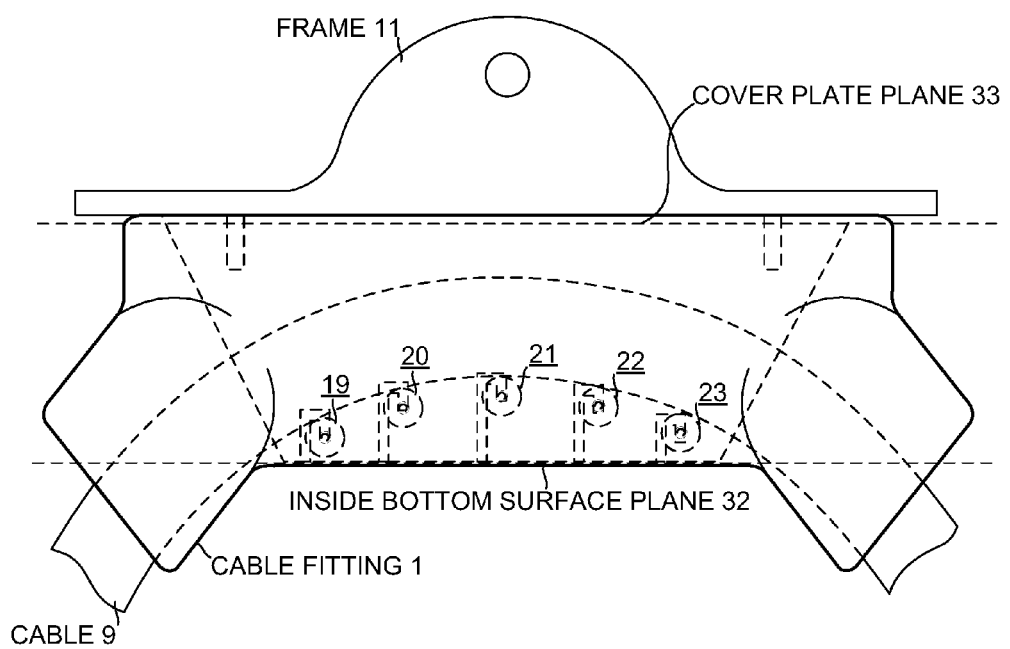
FIG. 6 (Prior Art) is a side view drawing of a roller support structure, a cable fitting, a cable fitting and a cable after the spacers have been removed from between the roller support structure and the cable fitting.
Figure 21:
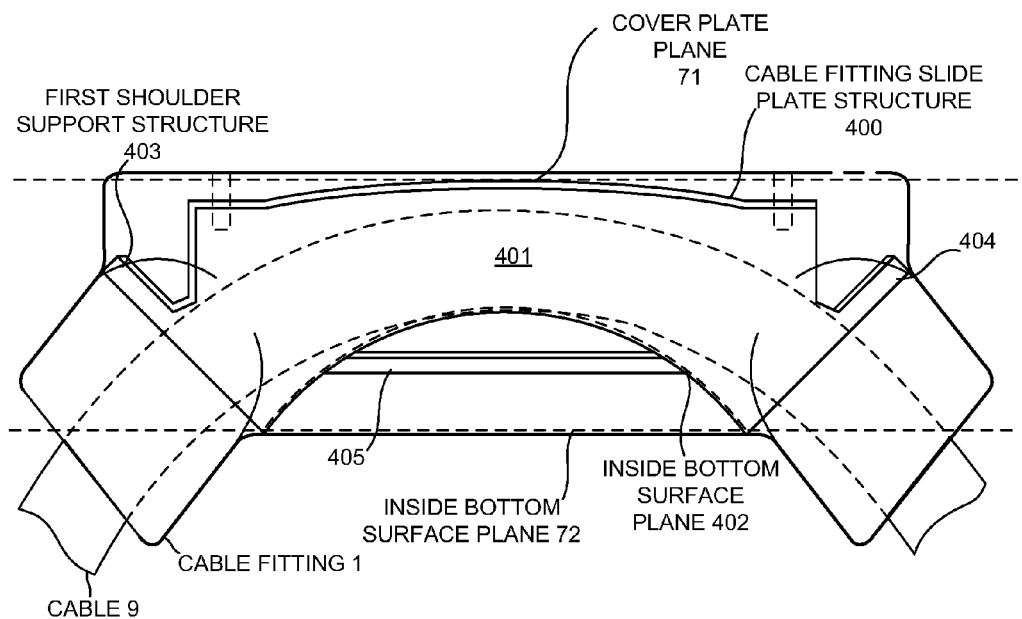
FIG. 21 is a drawing of a cable fitting with a cable fitting slide plate structure and cable.

FIG. 21 is a drawing of the Cable fitting slide plate structure 400 of FIG. 20 disposed within a cable fitting 1 and after a cable 9 has been moved or pulled through the cable fitting 1. Cable fitting 1 has a cover plate plane 71 and an inside bottom surface plane 72. In this novel embodiment, the cable fitting slide plate structure 400 is shown disposed entirely within the cable fitting below Cable 9 is placed on or above the inside bottom surface plane 72 and below cover plate plane 71. In an alternate embodiment, the cable fitting slide plate structure protrudes beyond the cover plate plane 71 and may include structures with holes for securing the cable fitting slide structure 400 to the cable fitting 1 using the holes in the cable fitting slide plate structure and the attachment holes 5-8 in cable fitting 1 (see. FIG. 2). In this embodiment, the top surface of the cable fitting support structure is planar and designed to receive the cover plate of the fitting in the same manner as cable fitting 1 is sealed using a cover plate and the attachment holes 5-8. The support shoulders 403 and 404 of the cable fitting slide plate structure are shown in contact with each end of cable fitting 1. To move cable 9 through the cable fitting 1, the cable fitting slide plate structure 400 is placed within the volume of the cable fitting. In some embodiments, the cable fitting slide plate structure will be fastened to the cable fitting 1 using the attachment holes 5-8 of the cable fitting 1. A pull rope is then pulled through the cable fitting through the first opening 2 of the cable fitting 1, through first shoulder support structure 403 of the cable fitting slide plate structure 400 and through the interior volume 401 and over the inside bottom surface plane of the cable fitting slide plate structure 400. The pull rope is then fed through the second shoulder support structure 404 of cable fitting slide plate structure 400 and then out of second opening 2 of the cable fitting 1. The pull rope is connected to the cable 9 and a force is applied to the rope by a wire tugger (not shown) or other means familiar to those skilled in the art to pull the cable through the fitting until cable 9 has been moved through the cable fitting 1 a desired length. Because the inside bottom surface plane is of arcuate radius and low friction, the cable 9 is able to be pulled through the cable fitting 1 without creating excessive sidewall pressure. In some novel embodiments, the cable is moved through more than one cable fittings with cable fitting slide plate structures simultaneously.

For additional explanation of how to make and use the "cable pulling device" disclosed in the description above, see U.S. Pat. No. 7,419,136 (Ser. No. 11/322,743), titled "Cable Pulling Device", by Christopher B. Martinez, filed Dec. 30, 2005. The subject matter of U.S. Pat. No. 7,419,136 is incorporated herein by reference.

Although certain specific embodiments are described above for instructional purposes, the teachings of this patent document have general applicability and are not limited to the specific embodiments described above.

What is claimed is:

1. A method comprising:

providing a roller support structure on a cable fitting, wherein the roller support structure has a first side plate having a channel, a first positioning plate and holding plate pair and a roller, on a cable fitting, and wherein the first positioning and holding plate pair includes a first positioning plate and a first holding plate, the first positioning plate and the first holding plate of the first positioning and holding plate pair each having a bottom portion, a first side, a second side and a channel, and wherein the channel of the first positioning plate extends from the first side of the first positioning plate to the second side of the first positioning plate and extends from the bottom portion of the first positioning plate, and wherein the first positioning plate is slideably coupled to the first holding plate, wherein the roller includes a roller axle, the roller axle being disposed within the channel of the first side plate, the channel of the first positioning plate and also within the channel of the first holding plate, and wherein said providing involves sliding the first positioning plate relative to the holding plate such to lock a position of the roller relative to the first positioning and holding plate pair and wherein the cable fitting has a first opening and a second opening; and moving a cable through the first opening into the cable fitting, over the roller of the roller support structure, and out of the cable fitting through the second opening.

2. The method of claim 1, wherein the first side plate comprises a second positioning plate and holding plate pair having a second positioning plate and a second holding plate, and wherein the second positioning plate and the second holding plate each have a bottom portion, a first side, a second side and a channel, and wherein the channel of the second positioning plate extends from the first side of the second positioning plate to the second side of the second positioning plate and extends from the bottom portion of the second positioning plate, and wherein the second positioning plate is slideably coupled to the second holding plate.

3. The method of claim 2, wherein said moving of the cable involves sliding the cable through the cable fitting.

4. The method of claim 2, wherein the cable fitting defines an interior volume, the roller being disposed in the volume.

5. The method of claim 4, wherein the interior volume of the cable fitting is defined by an inside bottom surface, the inside bottom surface being disposed in an inside bottom surface plane, wherein the cable fitting has a cover plate mating surface being disposed in a cover plate plane, the roller is disposed between said inside bottom surface plane and said cover plate plane, wherein the roller is disposed between the cable and the inside bottom surface plane during said moving of the cable through the cable fitting.

6. The method of claim 2, wherein the roller support structure comprises a movable handle and wherein the moveable handle is connected to each of the positioning plates of the first and second positioning and holding plate pairs, the method further comprising:

moving the handle and the positioning plates of the first and second positioning and holding plate pairs relative to the holding plates of the first and second positioning and holding plate pairs.

7. The method of claim 2, wherein the first and second positioning plates each have a plurality of channels that extend from the first side to the second side and vertically from the bottom portion of each respective positioning plate, and wherein the first and second holding plates each have a plurality of channels that extend from the first side to the second side and vertically from the bottom portion of each respective holding plate.

8. The method of claim 7 wherein the roller support structure includes a plurality of rollers.

9. The method of claim 2, wherein the channel of the first holding plate includes a vertical portion extending from the bottom portion and also includes a horizontal channel portion that perpendicularly extends from the vertical portion of the channel of the first holding plate.

10. The method of claim 9, wherein the channel of the second holding plate includes a vertical portion extending from the bottom portion and also includes a horizontal channel portion that perpendicularly extends from the vertical portion of the channel of the second holding plate.

11. The method of claim 9, wherein said providing involves sliding the first positioning plate relative to the first holding plate such that the vertical portion of the channel of the first positioning plate intersects the horizontal channel portion of the first holding plate.

12. The method of claim 11, wherein the roller axle is disposed within the vertical channel of the first positioning plate and within the horizontal channel portion of the first holding plate.

13. The method of claim 12 wherein the roller support structure includes a plurality of rollers.

14. The method of claim 9, further comprising:

sliding the first positioning plate relative to the first holding plate such that the vertical portion of the channel of the first positioning plate is aligned with the vertical portion of the channel of the first holding plate; and detaching the roller from the roller support structure after said sliding of the first positioning plate, the roller being detached when the cable is disposed in the cable fitting.

15. The method of claim 14, further comprising:

unmounting the roller support structure from the cable fitting after said moving.

16. A roller support structure comprising:

a frame having a rectangular edge, the edge having a width;

a first side plate that extends from the frame, the first side plate having a channel;

a roller having a roller axle; and a first positioning and holding plate pair that extends from the frame, wherein the first positioning and holding plate pair has a first positioning plate and a first holding plate, the first positioning plate and the first holding plate each having a bottom portion, a first side, a second side and a channel, and wherein the channel of the first positioning plate extends from the first side of the first positioning plate to the second side of the first positioning plate and extends from the bottom portion of the first positioning plate, wherein the roller axle is disposed within the channel of the first positioning plate and also within the channel of the first holding plate, and wherein the first positioning plate is slideably coupled to the first holding plate such to lock a position of the roller relative to the first positioning and holding plate pair.

17. The roller support structure of claim 16 wherein:

the first side plate comprises a second positioning and holding plate pair that extends from the frame, wherein the second positioning and holding plate pair has a second positioning plate and a second holding plate, the second positioning plate and the second holding plate each having a bottom portion, a first side, a second side and a channel, and wherein the channel of the second positioning plate extends from the first side of the second positioning plate to the second side of the second positioning plate and extends from the bottom portion of the second positioning plate, and wherein the second positioning plate is slideably coupled to the second holding plate.

18. The roller support structure of claim 17, wherein the roller axle is also disposed within the channel of the second holding plate.

19. The roller support structure of claim 17, wherein the channel of the first holding plate includes a vertical portion extending from the bottom portion and also a horizontal channel portion that perpendicularly extends from the vertical portion of the channel of the first holding plate and wherein the second holding plate includes a vertical portion extending from the bottom portion and also a horizontal channel portion that perpendicularly extends from the vertical portion of the channel of the second holding plate.

20. The roller support structure of claim 19, wherein the first holding plate, the second holding plate, the first positioning plate and the second positioning plate each includes a plurality of channels.

* * * * *